May 28, 1968   E. W. DWYER   3,386,004
LOW VOLTAGE SAFETY CIRCUIT FOR ELECTRIC POWER UNITS
Filed Aug. 9, 1965
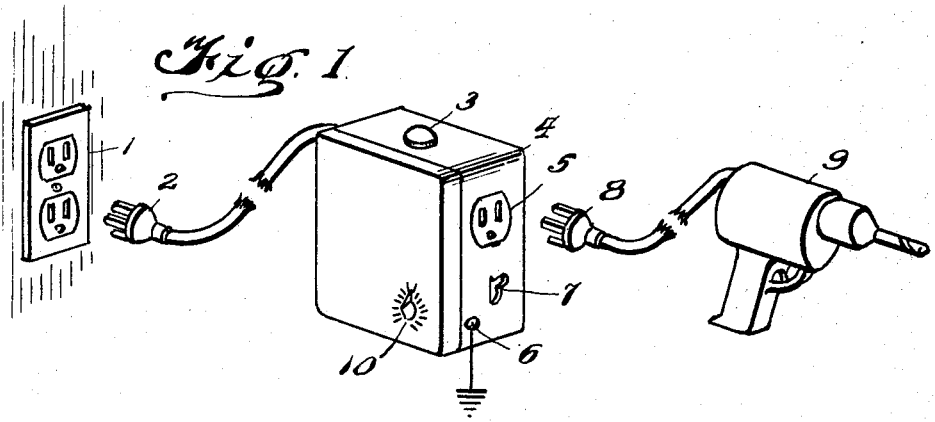
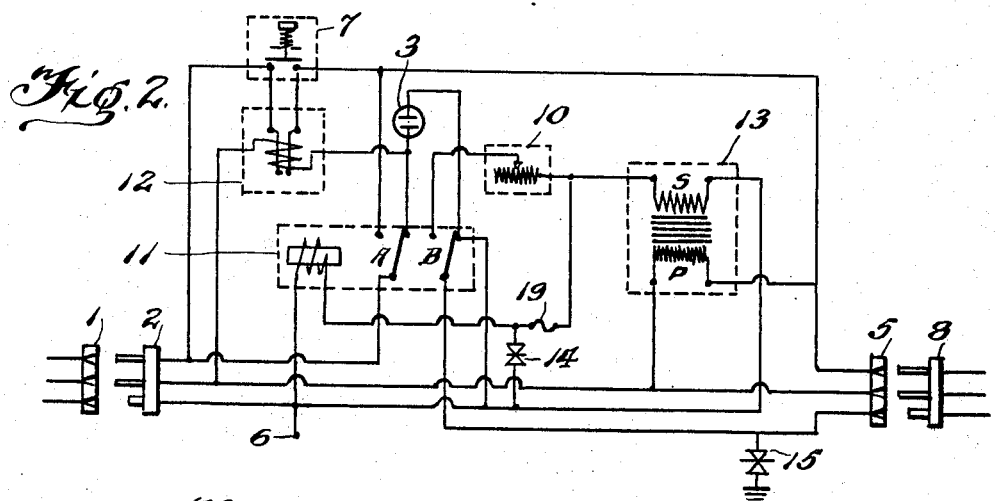
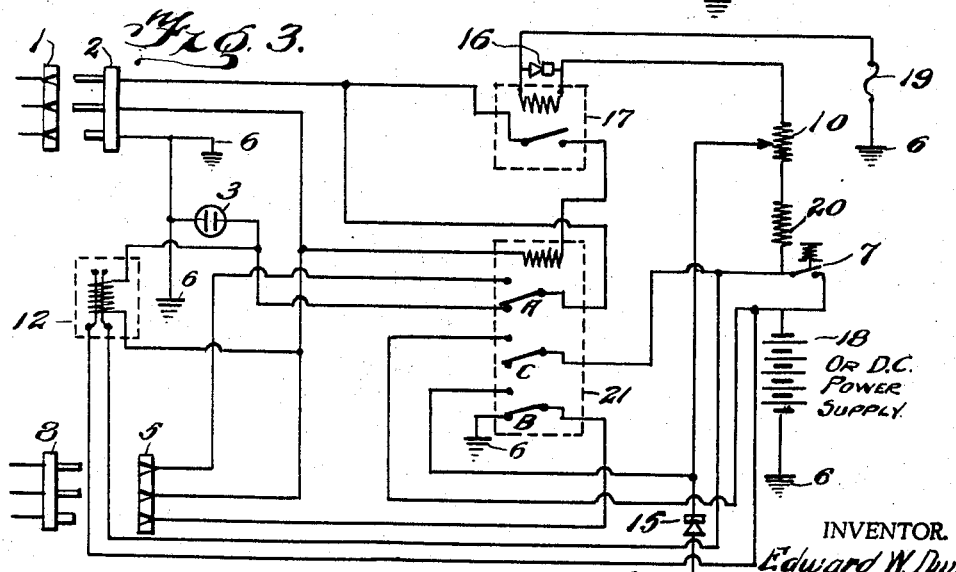
INVENTOR.
Edward W. Dwyer
BY
ATTORNEY United States Patent Office 3,386,004
Patented May 28, 1968

3,386,004
LOW VOLTAGE SAFETY CIRCUIT FOR
ELECTRIC POWER UNITS
Edward W. Dwyer, Riviera Beach, Fla., assignor to
Sentry, Inc., West Palm Beach, Fla.
Filed Aug. 9, 1965, Ser. No. 478,109
14 Claims. (Cl. 317—18)

ABSTRACT OF THE DISCLOSURE

A low voltage circuit to sense the contact of a handtool to a ground object for the protection of the tool and operator. A solid state semi-conductor interposed between the low voltage circuit and the third wire tool housing grounds the circuit when voltage occurs in excess of preset levels, regardless of whether the voltage source is from within or from without of the tool. Electrical and thermal switches are interposed in the circuit for instantaneous reaction, as well as visible polarity indicating means.

---

This invention relates to ground protector circuits for power tools and apparatus employing electric current, and more particularly is directed to safety devices designed to protect the operator of hand electric power tools, and also protect hidden ground objects in which the power tool may come in contact.

In the use of hand power tools, both rotary and reciprocating, such as drills, saws, reciprocating hammers, chisels, and the like, in testing, repairing and installing work, as well as removal of sections, in many applications such as buildings, streets and the like, there are frequently hidden ground materials such as water pipes, gas pipes, drain pipes, electrical wiring conduits, and the like, in which it is desired not to penetrate or otherwise injure; of like importance, is protection of the operator, who may be injured as the result of penetrating one of these hidden objects; and, the further protection against fire and explosion from penetrating gas pipes.

Accordingly, an object of this invention is to provide, in a three wire circuit, a protector circuit, to protect both the operator and any hidden ground material.

Another object of this invention is to provide a small unit with a protector circuit therein which may be interposed in the power line between the source of power and the power tool and function both as protector for hidden ground material and the operator and also as a indicator for proper operation of the power tool.

Another object of this invention is to provide a device of the class described with automatic resetting means and also with manual resetting means in the protector circuit interposed between a source of electric power supply in a hand tool.

Another object of this invention is to provide a protector circuit, as described which will be simple and economical in construction and efficient and durable in use.

The foregoing and other objects and advantages of this invention will be more apparent from the following specification, taken in conjunction with the drawings, forming a part thereof, wherein:

FIG. 1 is a disconnected artists view showing the relationship of a source of power with the protector box encasing the protector circuit, and power tool for connection thereto;

FIG. 2 is a diagrammatic view of the wiring circuit of one form of embodiment of this invention; and, FIG. 3 is a diagrammatic view of a modified form of the protector circuit of this invention.

Referring to the drawings, wherein like members are given the same reference numeral, a three wire wall plug 1 is indicated generally to receive a male three way plug 2 connected to the protector circuit, which has a visible neon light 3 to indicate when lit that proper electrical connections are made, power is available and goes off when the circuit is armed or energized to supply power to the tool. Said neon light 3 is externally visible in a container box 4, having an outlet plug 5 therein, a three-way plug S of the power tool 9.

The protector circuit, enclosed within the box 4, has an external ground post 6 connected with the ground of the protector circuit and positioned outside the box for easy attachment to any ground. Extending beyond the surface of the box 4 is a manual arming or resetting switch 7, as well as a manual control 10 for the sensitivity control for controlling the voltage or resistance potential in the safety circuit enclosed within the housing or box 4. As previously stated the protector circuit is designed for employment with a three way electric supply source, and has interposed on the ground side of said supply source and the ground side of said tool, and external common ground post 6 and visible neon light 3 and manual arming or circuit opening switch 7; and interposed is a sensitivity control which controls the sensitivity of the protector circuit for different operating conditions and uses, and which is electrically connected with a double throw double pole relay 11, illustrated in deenergized or open position, and having contacts A and B.

A thermal relay 12 is connected with the power side of the circuit and the manual control switch 7. The thermal relay 12 is a single throw relay, which upon heating opens the circuit, to energize a transformer 13 which will then energize the double pole relay 11 to turn off neon light 3, close contacts for flow of power to the tool and arm the low voltage protector circuit.

The transformer 13, having a primary side P and a secondary side S, is interposed in the protector circuit between the sensitivity control 10 and the hot or power lines from the protector circuit outlet 5. This transformer 13 circuit holds the double pole double throw relay 11 energized when in operation, until deenergized by drop of electrical potential due to contact of the bit of the tool with ground material, or the fuse 19 is blown by excessive electrical potential.

A Zener diode 14 is interposed between the field coil of relay 11, ground 6, and the sensitivity controlled secondary side S of the transformer 13; with a fuse 19 in the circuit between the sensitivity control 10 and field coil of the double pole double throw relay 11.

In the embodiment shown in FIG. 2, a second Zener diode 15 is interposed in the ground circuit and connected with the ground line of plug 5 and the circuit ground post 6, and before the double pole double throw relay 11 on the contact B.

The fuse 19 is interposed between the sensitivity control 10 and the Zener diode 14 circuit control to interrupt the circuit in the event an overload beyond the controlled setting of the Zener diode 14 is thrust upon the circuit.

In the modification shown in FIG. 3 a Zener diode 16 is interposed parallel or across the field coil single pole relay 17.

A single throw relay switch 17 is connected in the power side of the line to the field coil of a three pole double throw relay 21 having three sets of contacts A, B and C. Contact A being connected with the tool and thermal relay 12 and visible light 3; contact B being connected with the ground and sensitivity control 10; and, contact C being connected with a direct current source 18 and the manual control switch 7 and thermal relay 12. This embodiment of FIG. 3 employs a direct current supply as a controlled sensitivity source of power for the protector circuit.

In operation the device is quite simple and efficient. Illustrating the operation of the circuit of FIG. 2 as applied to the device in FIG. 1, the protectors circuit male plug 2 is inserted in the wall plug 1 and the tool plug 3 inserted in the female outlet 5. Power is then applied to the thermal relay 12, which, when heated, closes its contacts and energizes the transformer 13, which in turn energizes the double pole double throw relay 11 to throw the poles to permit power to flow through contact A of the relay 11 to the tool and also to hold transformer 13 energized. By depressing the manual contact 7 this procedure can be accelerated. With the double pole double throw relay 11 energized, the pole B thereof disconnects the ground connection and actuates the sensitivity control 10 of the protector circuit, and connects the circuit of the Zener diode 14 protector, through the sensitivity control 10 and holds the double pole double throw relay 11 activated or energized while the current flows through the contact A of the double throw relay 11 to the power tool.

Should the power tool bit contact ground material, current of the secondary circuit S of the transformer 13 is diverted from the field of the double pole double throw relay 11, deenergizing this relay 11, and throws poles A and B to the starting or open position.

The tool may be restarted by depressing the manual control switch 7, or waiting for the thermal relay 12 to heat up and connect or arm the circuit. Should there be a sudden voltage surge across the Zener diode 14 circuit, beyond the break-down voltage capacity of the Zener diode 14, the fuse 19 will burn out making the circuit ineffective and closing off all power to the power tool until the fuse is replaced.

The device as illustrated in FIG. 3 in connection with FIG. 1, is physically armed and ready for use in the same manner as above described with respect to the circuit of FIG. 2. In this circuit the three pole double throw relay 21, similar to the double pole double throw relay 11 of FIG. 2, differs in that a constant battery or direct current is employed on the third pole. The contact C of this relay 21 holds the direct current battery 18 connected to a resistor 20 when the manual switch 7 or thermal relay 12 drop out or contacts open so that the battery 18 feeds the field coil of the single relay 17 to hold the contact of the three pole relay 21 in operable position, or energized to flow current to the tool 9.

When the tool bit contacts ground material, diverting current from the field coil of the single pole relay 17, the current flows through the sensitivity control resistor 10, or rheostat, deenergizing the switch of the single throw single pole relay 17, to deenergizing the field coil of three pole double throw relay 21, causing the contacts to reverse and shut off the power to the tool, until manually reset by the manual switch 7, or when the thermal relay 12 is heated up to close the contacts.

If a voltage surge across the circuit of the ground connection of the tool bit exceeds the breakdown voltage capacity of the Zener diode 16, the fuse 19 burns out and the circuit cannot be rearmed until a fuse 19 is replaced.

A second Zener diode 15, connected to a ground and to the switching contact B of the double pole double throw relay 11 or three pole double throw relay 21 acts as a transient surge suppressor when the switching contact B thereof of the relay 11 or 21 is thrown.

Where Zener diodes are used, other fixed or solid state semiconductor having the desired characteristics may be used, such as thyrector surge voltage suppressors, silicon carbide resistors such as thyrite, and silicon central rectifiers.

The invention has been described in detail, but it is understood that the invention is not so limited; but, many changes and modifications can be made therein without departing from the spirit and scope of the invention as defined in the appended claims.

Having thus described the invention, what is claimed is:

1. A protector circuit for electric powered tools and apparatus comprising a low voltage circuit interposed and connected between the ground connection of said tool or apparatus and the power line for said tool or apparatus, said circuit comprising a switch to open and close said protector circuit, a fixed voltage breakdown semi-conductor interposed in said low voltage circuit and connected with said switch and the ground of the housing of said tool or apparatus, and means to open the switch contacts upon a voltage surge through the ground connection.

2. A protector circuit for electric powered tools and apparatus comprising a low voltage circuit interposed and connected between the ground connection of said tool or apparatus and the power line for said tool or apparatus, said protector circuit comprising a multiple pole multiple throw relay to open and close said circuit, a fixed voltage breakdown semi-conductor interposed in said low voltage circuit and connected with said switch and the ground of the housing of said tool or apparatus, and means to throw the contacts of said relay upon a voltage surge through the ground connection.

3. A protector circuit for electric powered tools and apparatus comprising a low voltage circuit interposed and connected between the ground connection of said tool or apparatus and the power line for said tool or apparatus, said protector circuit comprising a multiple pole multiple throw relay to open and close said circuit, a fixed voltage breakdown semi-conductor interposed in said low voltage circuit and connected with said switch and the ground of the housing of said tool or apparatus, one of said poles being connected with a ground connection, and the other pole to a resistor to open the relay contacts upon a voltage surge through the ground connection beyond the set potential of the resistor.

4. A protector circuit for electric powered tools and apparatus comprising a low voltage circuit connected between the power line ground and the ground line of the tool, said low voltage circuit comprising a multiple pole multiple throw relay, one of said relay poles being connected with a ground connection, and another of said relay poles being connected with a variable resistor, a fixed solid state semi-conductor connected in said low voltage circuit between the said relay and variable resistor to throw the said relay contacts upon a voltage surge at the ground connection of the tool exceeding the limit of said fixed semi-conducor.

5. A protector circuit for electric powered tools and apparatus comprising a low voltage circuit connected between the power line ground and the ground line of the tool, said low voltage circuit comprising a multiple pole multiple throw relay, one of said relay poles being connected with a ground connection, and another of said relay poles being connected with a resistor, a fixed solid state semi-conductor connected in said circuit between the said relay and resistor to throw the said relay contacts upon a voltage surge at the ground connection of the tool exceeding the limit of said fixed semi-conductor, and a fuse in said circuit positioned between said semi-conductor and said resistor to burn out when the voltage across said fixed semi-conductor exceeds the breakdown voltage of said semi-conductor.

6. A protector circuit for electric powered tools and apparatus comprising a low voltage circuit interposed and connected between the ground connection of said tool or apparatus and the power line for said tool or apparatus, said protector circuit comprising a switch to open and close said circuit, a fixed voltage breakdown semi-conductor interposed in said low voltage circuit and connected with said switch and the ground of the housing of said tool or apparatus, a visible signal to indicate when current is supplied and the polarity of said switch, and means to open the switch contacts upon a voltage surge through the ground connections.

7. A protector circuit for electric powered tools and apparatus comprising a multiple pole multiple throw relay, a variable resistor sensitivity control, one of said relay pole being connected with a ground connection, and the other of said relay poles being connected with said variable sensitivity control, a fixed voltage breakdown semi-conductor connected intermediate said relay and variable control, and a thermal relay to open and close said circuit.

8. A low voltage protector circuit for electric powered tools and apparatus, comprising a low voltage electric supply, a thermal relay having one side thereof connected with the power line to the power tool, a multiple pole multiple throw relay having ground contact points and power contact points, a solid state semi-conductor connected with said multiple pole relay and with ground connections, and a fuse interposed between said solid state semi-conductor and said multiple relay.

9. The device of claim 8 in which the relay is a double pole double throw relay.

10. The device of claim 8 in which the solid state semi-conductor is a Zener diode.

11. The device of claim 8 in which an electric light is connected with the thermal relay to indicate polarity when the circuit receives current and the thermal relay controls are open, and to cut current supply to said light when the thermal relay contacts are closed.

12. The device of claim 8 in which the multiple pole relay is a triple pole double throw relay, and the low voltage supply is a battery.

13. A protector circuit for electric powered tools and apparatus, comprising a low voltage supply, a thermal relay having one side thereof connected with the power line to the power tool, a transformer connected to said relay, a multiple pole multiple throw relay having ground contact points and power contact points connected to said thermal relay and said transformer, a Zener diode connected with said multiple pole relay and with ground connections, a fuse interposed between said Zener diode and said multiple relay, and a second Zener diode connected with the ground and a contact of the multiple pole relay.

14. The device of claim 13 in which a rheostat is connected with the multiple pole relay and Zener diode.

References Cited

UNITED STATES PATENTS 2,114,687   4/1938   Schmitt _____ 317—18

FOREIGN PATENTS 178,668   9/1934   Switzerland.
679,789   9/1952   Great Britain.
1,029,078   4/1958   Germany.

MILTON O. HIRSHFIELD, *Primary Examiner.*

R. V. LUPO, *Assistant Examiner.*